US012525199B2

(12) United States Patent
Byon

(10) Patent No.: US 12,525,199 B2
(45) Date of Patent: Jan. 13, 2026

(54) DISPLAY APPARATUS

(71) Applicant: LG Display Co., Ltd., Seoul (KR)

(72) Inventor: Sanghun Byon, Cheongju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/889,698

(22) Filed: Sep. 19, 2024

(65) Prior Publication Data

US 2025/0182704 A1 Jun. 5, 2025

(30) Foreign Application Priority Data

Dec. 4, 2023 (KR) ........................ 10-2023-0173424

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2310/0278* (2013.01); *G09G 2310/08* (2013.01); *G09G 2330/023* (2013.01); *G09G 2380/10* (2013.01)

(58) Field of Classification Search
CPC ...... G09G 3/3233; G09G 3/3266; G09G 3/20; G09G 3/32; G09G 3/3225; G09G 3/3291; G09G 3/3208; G09G 3/3406; G09G 3/3648; G09G 3/3275; G09G 3/3258; G09G 3/36; G09G 3/3696; G09G 2330/021; G09G 2330/028; G09G 2330/02; G09G 2310/08; G09G 2310/0286; G09G 2320/0233
See application file for complete search history.

(56) References Cited

U.S. PATENT DOCUMENTS

2022/0199008 A1* 6/2022 Lee ...................... G09G 3/3233
2024/0013736 A1* 1/2024 Jang ...................... G09G 3/3406
2024/0290287 A1* 8/2024 Park ..................... G09G 3/3291

FOREIGN PATENT DOCUMENTS

KR 10-2023-0065847 A 5/2023

* cited by examiner

*Primary Examiner* — Dong Hui Liang
(74) *Attorney, Agent, or Firm* — Morgan, Lewis & Bockius LLP

(57) ABSTRACT

A display apparatus includes a boost converter configured to boost a voltage input thereto to a high potential voltage and to output the high potential voltage; a pixel power circuit configured to generate a pixel driving voltage for operation of pixels disposed in the display apparatus based on the high potential voltage, and to supply the generated pixel driving voltage to the pixels; a buck converter configured to receive the high potential voltage to convert the received high potential voltage to a logic voltage, and to output the converted logic voltage; and a driver power circuit configured to receive the output logic voltage, to convert the received logic voltage to an operating voltage for operation of the display apparatus, and to output the operating voltage. Thus, even when power supplied from the vehicle's battery to the display apparatus is cut off, screen flashing is prevented from occurring.

13 Claims, 3 Drawing Sheets

(a)

(b)

DISPLAY APPARATUS

CROSS-REFERENCE TO RELATED APPLICATION

This application claims priority to Korean Patent Application No. 10-2023-0173424, filed on Dec. 4, 2023, in the Korean Intellectual Property Office, the contents of which are hereby expressly incorporated by reference into the present application.

BACKGROUND

Field

The present disclosure relates to a display apparatus, and more specifically, to a display apparatus mounted on a vehicle.

Description of Related Art

Representative examples of display apparatuses include liquid crystal display apparatuses (LCD), plasma display apparatuses (PDP), field emission display apparatuses (FED), electro luminescence display apparatuses (ELD), electro-wetting display apparatuses (EWD), and organic light emitting display apparatuses (OLED).

Among these display apparatuses, the organic light-emitting display apparatus displays an image through a pixel including an organic light-emitting element as a self-light-emitting element. Therefore, compared to other display apparatuses, the organic light emitting display apparatus has the advantage of having a smaller thickness, a wider viewing angle, and a faster response speed. Additionally, the display apparatus may be mounted on a dashboard or a navigation of a vehicle.

The display apparatus mounted on the vehicle receives power from the vehicle's battery. Thus, when insufficient power is supplied from the battery thereto or the power supplied to the display apparatus is cut off, an error may occur in the display apparatus or the display apparatus may malfunction.

Therefore, there is a need for a display apparatus that may operate stably when the insufficient power is supplied from the vehicle's battery to the display apparatus or the power supplied to the display apparatus is cut off.

SUMMARY

When the power supplied from the vehicle's battery is cut off, a screen flashing of the display apparatus may occur. Accordingly, the inventors of the present disclosure have invented a display apparatus that prevents malfunction of the display apparatus even when insufficient power is supplied from the vehicle's battery to the display apparatus or when the power supplied to the display apparatus is cut off.

Embodiments of the present disclosure are to provide a display apparatus that prevents screen flashing even when the power supplied from the vehicle's battery to the display apparatus is cut off.

Furthermore, embodiments of the present disclosure are to provide a display apparatus including a wiring for applying a voltage output from a boost converter within the display apparatus to a pixel power circuit and a wiring for applying the voltage output from the boost converter to a buck converter.

Embodiments of the present disclosure are not limited to the above-mentioned purpose. Other embodiments and advantages according to the present disclosure that are not mentioned may be understood based on following descriptions and may be more clearly understood based on embodiments according to the present disclosure. Further, it will be easily understood that the purposes and advantages according to the present disclosure may be realized using means shown in the claims or combinations thereof.

A display apparatus mounted on a vehicle according to example embodiments of the present disclosure is provided.

Furthermore, according to an example embodiment of the present disclosure, a display apparatus including a buck converter that adjusts a high potential voltage output from a boost converter to a logic voltage and outputs the logic voltage is provided.

Furthermore, according to an example embodiment of the present disclosure, a display apparatus including the buck converter that adjusts the high potential voltage of 20V received from the boost converter to the logic voltage of 3.3V and outputs the logic voltage to a driver power circuit is provided.

Furthermore, according to an example embodiment of the present disclosure, a display apparatus including the buck converter electrically connected to the boost converter via a wiring and configured to receive the high potential voltage output from the boost converter while the voltage supplied from an external source to the display apparatus is cut off is provided.

Furthermore, according to an example embodiment of the present disclosure, a display apparatus is provided which includes a driver power circuit that generates an operating voltage based on the logic voltage of 3.3V received from the boost converter and provides the operating voltage to a gate driver such that the gate driver transmits a light-emission control signal to a light-emission control transistor.

Furthermore, according to an example embodiment of the present disclosure, a display apparatus is provided which includes a driver power circuit that generates an operating voltage based on the logic voltage of 3.3V received from the boost converter and provides the operating voltage to a gate driver such that the gate driver transmits a scan signal to each of a data supply transistor and a compensation transistor.

According to an example embodiment of the present disclosure, the buck converter adjusts the high potential voltage output from the boost converter to the logic voltage and outputs the logic voltage. Thus, even when the power supplied from the vehicle's battery to the display apparatus is cut off, the screen flashing may be prevented from occurring.

Furthermore, according to an example embodiment of the present disclosure, the boost and the buck converter are electrically connected to each other via the wiring without adding a circuit function or a new configuration to an existing structure, thereby removing the screen flashing of the display apparatus due to the power cutoff.

Furthermore, the display apparatus according to an example embodiment of the present disclosure may prevent occurrence of the short circuit in the light emitting diode even when the power supplied from the vehicle's battery to the display apparatus is cut off, thereby suppressing the screen flashing of the display apparatus due to the power cutoff.

The advantages and effects according to the present disclosure are not limited to those described above, and additional advantages and effects are included in or may be obtained from the present disclosure.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF DRAWINGS

The accompanying drawings, which are included to provide a further understanding of the disclosure and are incorporated in and constitute a part of the disclosure, illustrate embodiments of the disclosure and together with the description serve to explain the principles of the disclosure.

DETAILED DESCRIPTIONS

Figure 1:
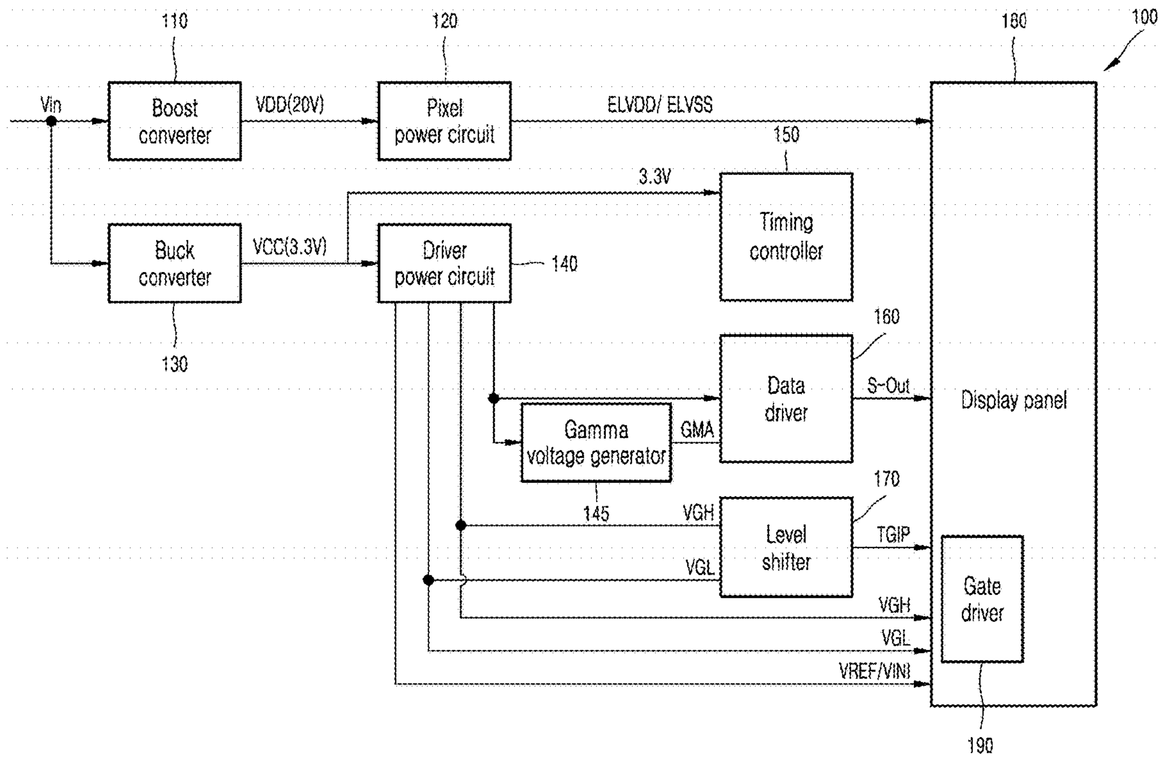
FIG. 1 is a block diagram showing a display apparatus according to an example embodiment of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

For simplicity and clarity of illustration, elements in the drawings are not necessarily drawn to scale. The same reference numbers in different drawings represent the same or similar elements, and as such perform similar functionality, unless otherwise specified.

In the following description, descriptions and details of well-known steps and elements may be omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The shapes, dimensions, areas, lengths, thicknesses, ratios, angles, numbers, and the like, which are illustrated in the drawings to describe various example embodiments of the present disclosure, are merely given by way of example.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise.

It should be further understood that the terms "comprise," "comprising," "include," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

It will be understood that when an element or layer is referred to as being "connected to," or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate area, or the like is be disposed "on" or "on a top" of another layer, film, region, plate area, or the like, the former may directly contact the latter or still another layer, film, region, plate area, or the like may be disposed between the former and the latter. As used herein, when a layer, film, region, plate area, or the like is directly disposed "on" or "on a top" of another layer, film, region, plate area, or the like, the former directly contacts the latter and still another layer, film, region, plate area, or the like is not disposed between the former and the latter. Further, as used herein, when a layer, film, region, plate area, or the like is disposed "below" or "under" another layer, film, region, plate area, or the like, the former may directly contact the latter or still another layer, film, region, plate area, or the like may be disposed between the former and the latter. As used herein, when a layer, film, region, plate area, or the like is directly disposed "below" or "under" another layer, film, region, plate area, or the like, the former directly contacts the latter and still another layer, film, region, plate area, or the like is not disposed between the former and the latter.

In descriptions of temporal relationships, for example, temporal precedent relationships between two events such as "after," "subsequent to," "before," etc., another event may occur there between unless "directly after," "directly subsequent," or "directly before" is not indicated.

Where a certain embodiment may be embodied differently, a function or an operation specified in a specific block may occur in a different order from an order specified in a flowchart. For example, two blocks in succession may be actually performed substantially concurrently, or the two blocks may be performed in a reverse order depending on a function or operation involved.

It should be understood that, although the terms "first", "second", "third", and so on may be used herein to describe various elements, components, regions, layers and/or sections, these elements, components, regions, layers and/or sections should not be limited by these terms. These terms are used to refer to one element, component, region, layer or section separately from another element, component, region, layer, or section. Thus, a first element, component, region, layer, or section described under could be termed a second element, component, region, layer, or section, without departing from the spirit and scope of the present disclosure.

Spatially relative terms, such as "beneath," "below," "lower," "under," "above," "upper," and the like, may be used herein for ease of explanation to describe one element or feature's relationship to another element or feature as illustrated in the figures. It should be understood that the spatially relative terms are intended to encompass different orientations of the apparatus in use or in operation, in addition to the orientation depicted in the figures. For example, where the apparatus in the drawings may be turned over, elements described as "below" or "beneath" or "under" other elements or features would then be oriented "above" the other elements or features. Thus, the example terms "below" and "under" may encompass both an orientation of above and below. The apparatus may be otherwise oriented for example, rotated 90 degrees or at other orientations, and the spatially relative descriptors used herein should be interpreted accordingly.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

In interpreting a numerical value, the value should be construed as including an error or tolerance range even where no explicit description of such an error or tolerance range is provided.

Unless otherwise defined, all terms including technical and scientific terms used herein have the same meaning as commonly understood by one of ordinary skill in the art to which this inventive concept belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

As used herein, "embodiments," "examples," "aspects," and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas but should be understood as examples of the terms for illustrating embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Hereinafter, example embodiments of the present disclosure will be described in detail with reference to the accompanying drawings.

FIG. 1 is a block diagram showing a display apparatus according to an example embodiment of the present disclosure.

As shown in FIG. 1, a display apparatus 100 according to an embodiment of the present disclosure includes a display panel 180, a timing controller 150, a data driver 160, a gate driver 190, and a power circuit.

According to an example embodiment, in a display area of the display panel 180 where an input image is displayed, data lines extending in a column direction and gate lines extending in a row direction may intersect. Pixels may be respectively disposed at intersections between the data and gate lines and be arranged in a matrix manner to form a pixel array. Each data line may be commonly connected to pixels arranged in the column direction, and each gate line may be commonly connected to pixels arranged in the row direction.

According to an example embodiment, the timing controller 150 may receive timing signals such as a vertical synchronization signal, a horizontal synchronization signal, a data enable signal, and a dot clock from a host system, and may generate a data timing control signal for controlling an operation of the data driver 160, and a gate timing control signal for controlling an operation of the gate driver 190.

According to an example embodiment, the timing controller 150 may receive image data DATA from the host system, obtain a deviation correction value, and then correct the image data DATA based on the deviation correction value. The deviation correction value may be used to compensate for a difference between operation characteristics of pixels.

Since the operation characteristics of the pixel change not only based on an operation time but also based on a panel temperature, the timing controller 150 may further take the panel temperature into consideration when correcting the image data.

The timing controller 150 may supply corrected image data DATA to the data driver 160 through an internal interface circuit.

According to an example embodiment, the data driver 160 is connected to the pixels via the data lines. The data driver 160 generates a data voltage S-Out required for pixel operation according to the data timing control signal and supplies the data voltage to the data lines. The data driver 160 may receive a gamma reference voltage GMA from a gamma voltage generator 145 and divide the gamma reference voltage GMA to generate gamma compensation voltages. Additionally, the data driver 160 may generate the data voltage S-Out by mapping the gamma compensation voltages to the corrected image data. This data driver 160 may include a shift register, a latch, a digital analog converter, and an output buffer.

According to an example embodiment, the gate driver 190 is connected to the pixels via the gate lines. The gate driver 190 generates scan signals based on the gate timing control signal and supplies each scan signal to the gate lines in accordance with a supply timing of the data voltage S-Out. A horizontal display line to which the data voltage is to be supplied may be selected based on the scan signal. Each scan signal may be generated in a form of a pulse that swings to between a gate on level VGH and a gate off level VGL. The scan signal at the gate on level VGH is set to a voltage higher than a threshold voltage of a transistor. The scan signal at the gate off level VGL is set to a voltage lower than the threshold voltage of the transistor. The transistor included in the pixel is turned on in response to the scan signal at the gate on level VGH, while the transistor is turned off in response to the scan signal at the gate off level VGL.

According to an example embodiment, the gate timing control signal is boosted to the gate on level VGH and the gate off level VGL by the level shifter 170 and then supplied to the gate driver 190. The boosted gate timing control signal is labeled "TGIP". TGIP may include a gate start signal, a gate shift clock signal, etc. Driving power at the gate on level VGH and driving power at the gate off level VGL may be further supplied to the gate driver 190. The gate driver 190 may be implemented using a gate shift register composed of a plurality of stages. The gate shift register may include multiple scan output stages connected to each other in a cascade manner. The scan output stages may be independently connected to the gate lines and output the scan signals to the gate lines. The gate shift register may be formed directly in the bezel area as the non-display area of the display panel 180 using a gate driver in panel manner. The bezel area may be located outside the display area.

According to an example embodiment, the power circuit includes a pixel power circuit 120 connected to a boost converter 110 and a driver power circuit 140 connected to a buck converter 130.

According to an example embodiment, the boost converter 110 acts as a step-up converter for boosting or increasing an input voltage Vin input from the battery of the vehicle. The boost converter 110 adjusts an output voltage thereof using an inductor, a diode, a capacitor, a power switch, etc. The boost converter 110 adjusts a ratio of an opening time and a closing time of a power switch to obtain a desired DC output voltage. A high potential voltage VDD (for example, 20V) as a direct current output voltage of the boost converter 110 is supplied to the pixel power circuit 120.

In this way, the boost converter 110 may boost the voltage supplied from the vehicle's battery to the high potential voltage and supply the high potential voltage to the pixel power circuit 120.

According to an example embodiment, the pixel power circuit 120 receives the high potential voltage VDD as an input thereto and generates a pixel driving voltage ELVDD and ELVSS (e.g., 13.5V) required for an operation of the pixel, based on the VDD. The pixel power circuit 120 may be implemented using a two-phase power circuit and may contribute to reducing power consumption in a large and high-resolution model. The two-phase power circuit may include switching elements that selectively output the high potential voltage VDD and a base voltage to generate the pixel driving voltage ELVDD and ELVSS (e.g., 13.5V) and inductors which accumulate and output input energy in association with the switching operations of the switching elements, and may further include compensation coils opposing to the inductors, respectively.

In this way, the pixel power circuit 120 may generate the pixel driving voltage ELVDD and ELVSS necessary for the operation of the pixels provided in the display apparatus 100, based on the high potential voltage received from the boost converter 11, and may supply the generated pixel driving voltage ELVDD and ELVSS each of the pixels.

According to an example embodiment, the display apparatus 100 may include the driver power circuit 140 connected to the buck converter 130.

According to an example embodiment, the buck converter 130 acts as a step-down converter for bucking or lowering the input voltage Vin. The buck converter 130 may adjust an output voltage thereof using an inductor, a diode, a capacitor, a power switch, etc. The buck converter 130 adjusts a ratio of opening and closing times of the power switch to obtain a desired direct current output voltage. A logic voltage VCC (for example, 3.3V) as a direct current output voltage of the buck converter 130 is supplied to the driver power circuit 140. The driver power circuit 140 may receive the logic voltage VCC as an input thereof and may generate an operating voltage required for an operation of each of the gamma voltage generator 145 and the data driver 160, based on the VCC.

In this way, the buck converter 130 may adjust the input voltage Vin output from the battery of the vehicle to the logic voltage (e.g., 3.3V) and output the logic voltage to the drive power circuit 140. Furthermore, the buck converter 130 may supply the adjusted logic voltage (e.g., 3.3V) to the timing controller 150 within the display apparatus 100.

For example, the buck converter 130 adjusts the input voltage Vin output from the battery of the vehicle to the logic voltage VCC of 3.3V and outputs the VCC to each of the driver power circuit 140, and the timing controller 150.

According to an example embodiment, the buck converter 130 may be electrically connected to the driver power circuit 140, and the timing controller 150.

According to an example embodiment, the driver power circuit 140 may generate the driving power of the gate on level VGH and the driving power of the gate off level VGL required for the operation of each of the level shifter 170 and the gate driver 190, based on the logic voltage VCC.

Furthermore, the driver power circuit 140 may further generate a reference voltage VREF and an initialization voltage VINI required for an operation of the pixels based on the logic voltage VCC. Depending on a structure of the pixel, at least one of the reference voltage VREF and the initialization voltage VINI may be supplied to the pixels.

According to an example embodiment, the driver power circuit 140 may convert the logic voltage (e.g., 3.3V) output from the buck converter 130 into an operating voltage required for the operation of the display apparatus 100, and then may provide the operating voltage to the compoents of the display apparatus 100 (e.g., the data driver 160, the gamma voltage generator 145, the level shift 170, the gate driver 190, and the display panel 180).

For example, the driver power circuit 140 may generate the operating voltage for operating each of the data driver 160 and the gate driver 190 of the display apparatus 100 based on the logic voltage (e.g., 3.3V) output from the buck converter 130, and may supply the operating voltage to each of the data driver 160 and the gate driver 190. The driver power circuit 140 may generate the reference voltage required for the operation of the pixels of the display apparatus 100, based on the logic voltage VCC, and may supply the reference voltage to the display apparatus 100.

Furthermore, the driver power circuit 140 may generate an operating voltage based on the logic voltage VCC of 3.3V received from the boost converter 110 and may transmit the operating voltage to the data driver 160 to transmit a light-emission control signal to a light-emission control transistor in each pixel.

Furthermore, the driver power circuit 140 may generate an operating voltage based on the logic voltage VCC of 3.3V received from the boost converter 110 and may transmit the operating voltage to the gate driver 190 to transmit a scan signal to each of a data supply transistor and a compensation transistor in each pixel.

Each of these pixels may include the data supply transistor, the compensation transistor, and the light-emission control transistor. Furthermore, each of the pixels may include a plurality of various transistors.

Figure 2:
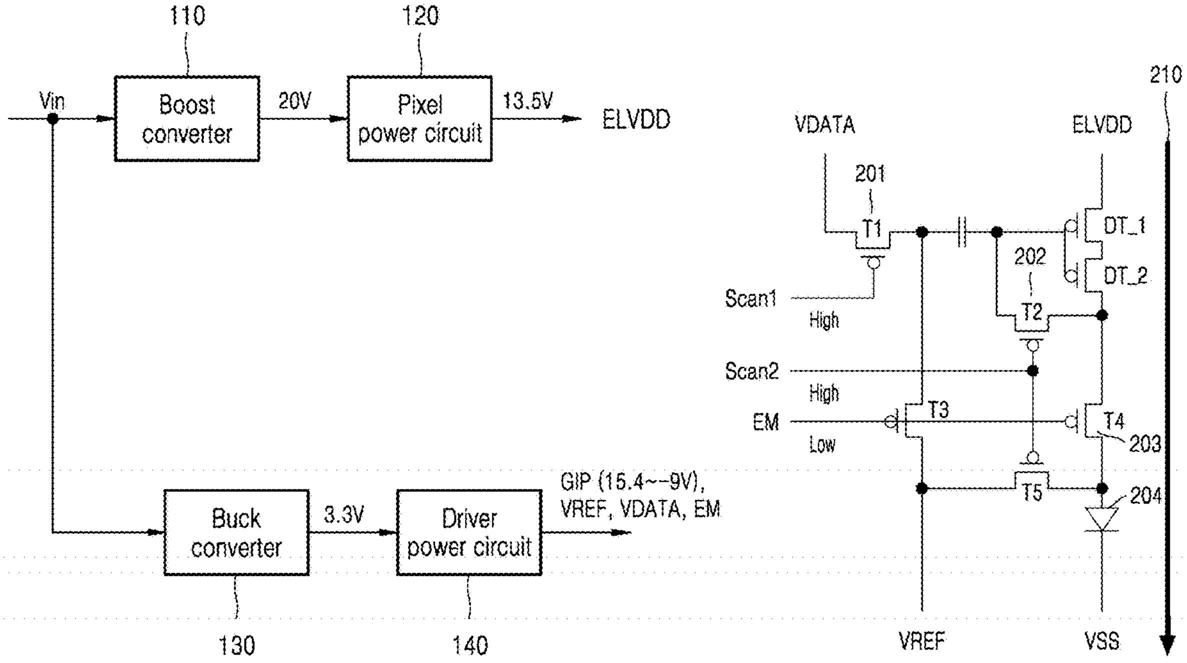
FIG. 2 is an example circuit diagram of a display apparatus when the display apparatus operates based on voltage supplied from a battery of a vehicle according to an example embodiment of the present disclosure.
Figure 3:
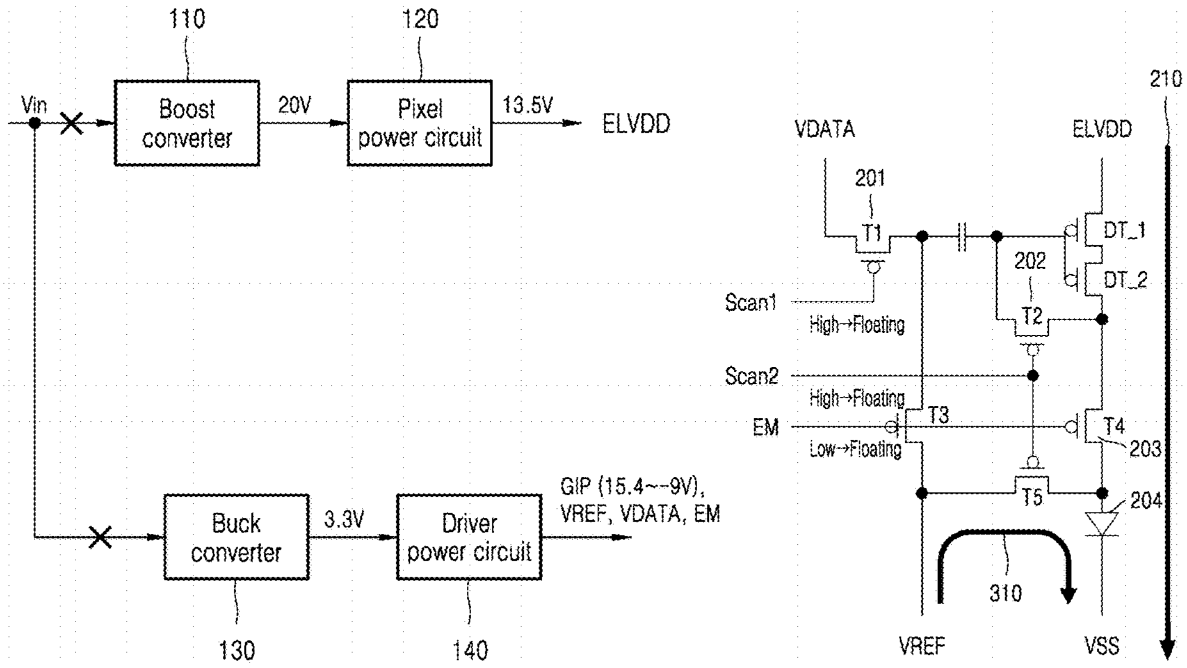
FIG. 3 is an example circuit diagram of a display apparatus when voltage supply from the vehicle's battery to the display apparatus is cut off.

FIG. 2 is an example circuit diagram of a display apparatus in which the display apparatus operates based on a voltage supplied from a battery of a vehicle according to one embodiment of the present disclosure. FIG. 3 is an example circuit diagram of the display apparatus when the voltage supply from the vehicle's battery thereto is cut off.

As shown in FIG. 1, FIG. 2, and FIG. 3, the pixel power circuit 120 of the display apparatus 100 according to one embodiment of the present disclosure may generate the pixel driving voltage ELVDD required for operation of the pixels and may supply the pixel driving voltage ELVDD to each pixel provided in the display panel 180.

In addition, the driver power circuit 140 may generate the driving power of the gate on level VGH and the driving power of the gate off level VGL required for the operation of each of the gate driver 190, based on the logic voltage VCC of 3.3V supplied from the buck converter 130, and then may supply the driving power of the gate on level VGH and the driving power of the gate off level VGL to the gate driver 190.

Furthermore, the driver power circuit 140 may generate the reference voltage VREF required for operation of the pixels based on the logic voltage VCC and supply the reference voltage VREF to each pixel.

Furthermore, the driver power circuit 140 may generate an operating voltage based on the logic voltage VCC of 3.3V received from the boost converter 110 and may transmit the operating voltage to the data driver 160 to transmit a scan signal to each of the data supply transistor, the compensation transistor, and the light-emission control transistor in each pixel.

Each of transistors DT_1, DT_2, and T1 to T5 may be a P type thin-film transistor or an N type thin-film transistor. In an embodiment of FIG. 2, each of the transistors DT_1, DT_2, and T1 to T5 may be embodied as the P type thin-film transistor. However, the display apparatus 100 of the present disclosure is not limited thereto. Depending on an embodiment, all or some of the transistors DT_1, DT_2, and T1 to T5 may be embodied as P type thin-film transistors or N type thin-film transistors. Furthermore, the N type thin-film transistor may be an oxide thin-film transistor, and the P type thin-film transistor may be a low temperature polycrystalline silicon (LTPS) thin-film transistor.

For example, when the driver power circuit 140 generates an operating voltage and transfers the operating voltage to the gate driver 190, the gate driver 190 may transmit a first scan signal of a high voltage to a gate terminal of a first transistor (e.g., a data supply transistor 201) of the pixel, based on the operating voltage. Then, the first transistor (e.g., the data supply transistor 201) is turned on based on the first scan signal.

Furthermore, the gate drive 190 may transmit a second scan signal of a high voltage to a gate terminal of a second transistor (e.g., a compensation transistor 202) of the pixel based on the operating voltage. Then, the second transistor (e.g., the compensation transistor 202) is turned on based on the second scan signal.

Furthermore, the gate drive 190 may transmit the light-emission control signal of a low-voltage to a gate terminal of a third transistor (e.g., a light-emission control transistor 203) of the pixel based on the operating voltage. Then, the third transistor (e.g., the light-emission control transistor 203) is turned on based on the light-emission control signal.

In this way, each of the first transistor (e.g., the data supply transistor 201), the second transistor (e.g., the compensation transistor 202), and the third transistor (e.g., the light-emission control transistor 203) may be turned on, such that the pixel driving voltage ELVDD (e.g., 13.5V) output from the pixel power circuit 120 may be applied 210 to the transistors in the pixel. Thus, a light-emitting element 204 emits light under the pixel driving voltage ELVDD output from the pixel power circuit 120.

However, as shown in FIG. 3, when the voltage supplied from the vehicle's battery is cut off (e.g., when the vehicle's battery is forcibly turned off), a voltage level of each of the first scan signal and the second scan signal respectively supplied to the first transistor (e.g., the data supply transistor 201) and the second transistor (e.g., the compensation transistor 202) changes from a high state to a floating state, and furthermore, a voltage level of the light-emission control scan signal supplied to the third transistor (e.g., the light-emission control transistor 203) also changes from a high state to a floating state. Eventually, a short circuit 310 may occur in a light-emitting element (e.g., diode) 204 as the light-emitting element.

Thus, when the power is turned off, a delay for stabilizing to a ground level is large because the high-potential voltage (e.g., 20V) is higher than the logic voltage (e.g., 3.3V). For this reason, the short circuit 310 may occur in the light-emitting element 204, and this short circuit may cause the light-emitting element 204 to emit light for several ms, such that the screen of the display apparatus 100 flashes.

Figure 4:
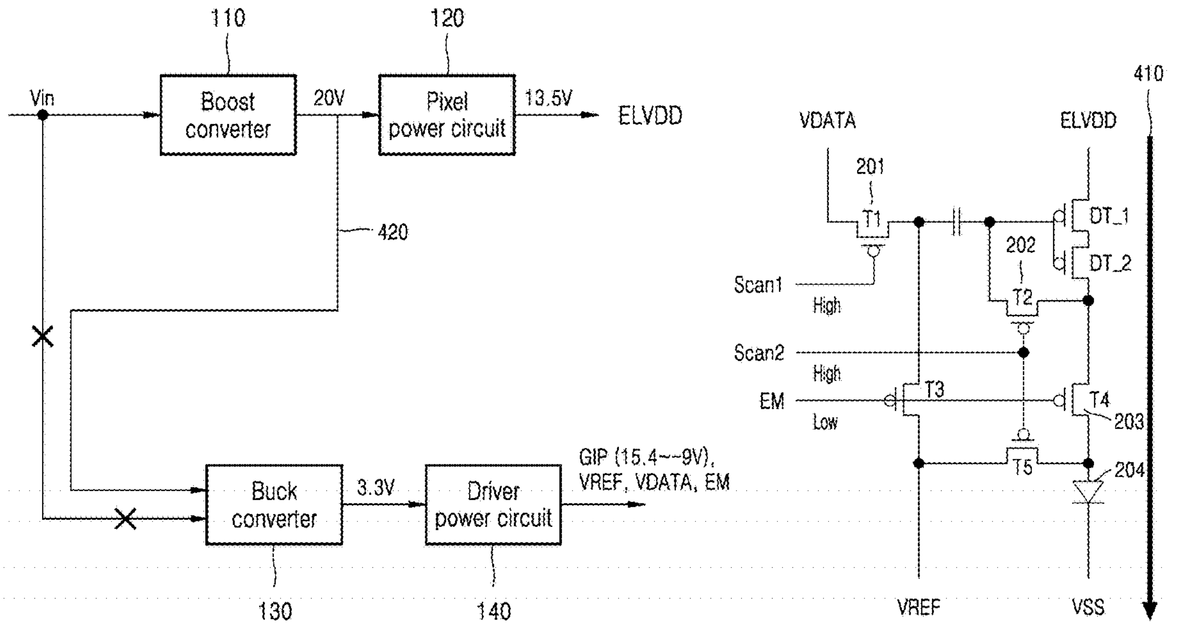
FIG. 4 is an example circuit diagram of a display apparatus when the display apparatus operates based on voltage supplied from a battery of a vehicle according to another example embodiment of the present disclosure.

FIG. 4 is an example circuit diagram of a display apparatus in which the display apparatus operates based on a voltage supplied from a battery of a vehicle according to another embodiment of the present disclosure.

In the circuit diagram of FIG. 4, components duplicate with those in the circuit diagram of each of FIG. 2 and FIG. 3 are omitted.

According to one embodiment, the buck converter 130 may receive the high potential voltage (e.g., 20V) output from the boost converter 110 through a wiring 420 electrically connected to and disposed between the boost converter 110 and the buck converter 130. Additionally, the buck converter 130 may convert the high potential voltage (e.g., 20V) to the logic voltage (e.g., 3.3V) and output the logic voltage to the drive power circuit 140.

According to an example embodiment, the buck converter 130 may be electrically connected to the boost converter 110 so that the buck converter 130 may receive the high potential voltage 20V output from the boost converter 110 while the voltage supplied from the vehicle's battery to the display apparatus is cut off.

Based on this circuit structure, the display apparatus 100 according to example embodiments the present disclosure may maintain the voltage level of each of the first scan signal supplied to the first transistor (e.g., the data supply transistor 201) and the second scan signal supplied to the second transistor (e.g., the compensation transistor 202) at the high state. Furthermore, the display apparatus 100 may maintain the voltage level of the light-emission control scan signal supplied to the third transistor (e.g., the light-emission control transistor 203) at the high state. Thus, the short circuit may be prevented from occurring in the light-emitting element 204.

Figure 5A:
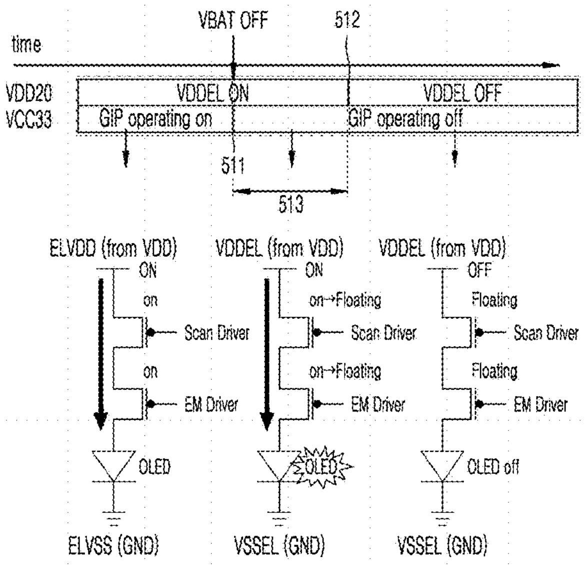
FIG. 5A is an example circuit diagram showing an operating state of a pixel over time when power supplied to a display apparatus is cut off according to an example embodiment of the present disclosure.
Figure 5B:
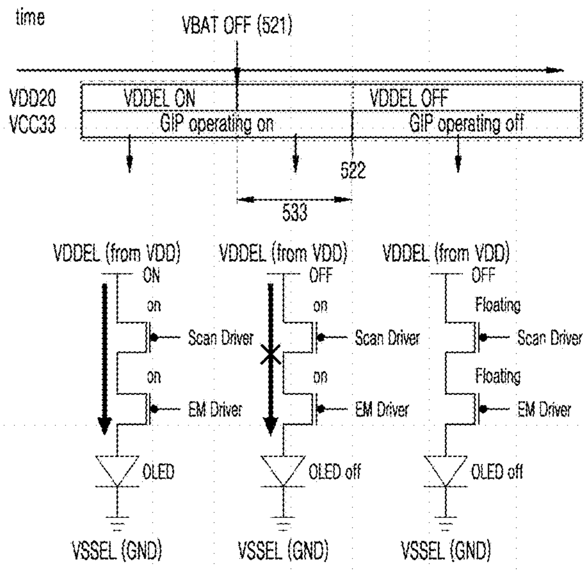
FIG. 5B is an example circuit diagram showing an operating state of a pixel over time when power supplied to a display apparatus is cut off according to another example embodiment of the present disclosure.

FIG. 5A is an example diagram showing an operating state of a pixel over time when the power supplied to the display apparatus is cut off according to an example embodiment of the present disclosure. FIG. 5B is an example diagram showing an operating state of the pixel over time when the power supplied to the display apparatus is cut off according to another example embodiment of the present disclosure.

As shown in FIG. 5A, while a voltage of 20V is supplied from the vehicle battery to the display apparatus, the pixel power circuit 120 of the display apparatus 100 may apply the driving voltage (e.g., 13.5V) to the display panel 180 such that each pixel of the display panel 180 operates (a left side of FIG. 5A). That is, the pixel power circuit 120 applies the pixel driving voltage ELVDD (e.g., 13.5V) to the transistors in the pixel, and the driver power circuit 140 applies the operating voltage required for the operation of the gate driver 190 to the gate driver 190. Eventually, the light-emitting element 204 emits light under the pixel driving voltage ELVDD output from the pixel power circuit 120.

Then, when the supply of the voltage from the battery to the display apparatus is cut off at a first point 511, the driving voltage (e.g., 13.5V) is applied to the display panel 180 by a second point 512, while the driver power circuit 140 does not supply the operating voltage required for the operation of the gate driver 190 to the gate driver 190. Accordingly, the driver power circuit 140 is turned off.

That is, a short circuit 310 occurs in the light-emitting element 204 for a duration 513 between the first point 511 and the second point 512 (a center of FIG. 5A). Under this short circuit, the light-emitting element 204 emits light for several ms. Thus, the screen of the display apparatus 100 flashes.

Then, the driving voltage (e.g., 13.5V) is not applied to the display panel 180 after the second point 512. Thus, each pixel does not operate (a right side of FIG. 5A).

As shown in FIG. 5B, while the voltage of 20V is supplied from the vehicle battery to the display apparatus, the pixel power circuit 120 of the display apparatus 100 supplies the driving voltage (e.g., 13.5V) to the display panel 180 such that each pixel of the display panel 180 operates (a left side of FIG. 5B). That is, the pixel power circuit 120 applies the pixel driving voltage ELVDD (e.g., 13.5V) to the transistors in the pixel, and the driver power circuit 140 applies the operating voltage required for the operation of the gate driver 190 to the gate driver 190. Eventually, the light-emitting element 204 emits light under the pixel driving voltage ELVDD output from the pixel power circuit 120.

Then, when the supply of the voltage from the battery to the display apparatus is cut off at a third point 521, the driving voltage (e.g., 13.5V) is not applied to the display panel 180 from the third point 521. However, the driver power circuit 140 supplies the operating voltage required for operation of the gate driver 190 to the gate driver 190 by a fourth point 522. Accordingly, the light-emitting element 204 does not operate from the third point 521 (a center of FIG. 5B).

Then, after the fourth point 522, the logic voltage (e.g., 3.3V) is not provided to the gate driver 190, so that each pixel does not operate (a right side of FIG. 5B).

A display apparatus according to some aspects and embodiments of the present disclosure may be set forth as follows.

A first aspect of the present disclosure provides a display apparatus comprising: a boost converter configured to boost a voltage input thereto to a high potential voltage and to output the high potential voltage; a pixel power circuit configured to receive the high potential voltage, to generate a pixel driving voltage required for operation of pixels disposed in a display apparatus, based on the high potential voltage, and to supply the generated pixel driving voltage to the pixels; a buck converter configured to receive the high potential voltage output from the boost converter, to convert the high potential voltage to a logic voltage, and to output the logic voltage; and a driver power circuit configured to receive the output logic voltage, to convert the logic voltage to an operating voltage required for operation of the display apparatus, and to output the operating voltage. Thus, even when the power supplied from the vehicle's battery to the display apparatus is cut off, the screen flashing may be prevented from occurring.

In accordance with some embodiments of the first aspect, the buck converter is configured to supply the logic voltage to a timing controller disposed in the display apparatus.

In accordance with some embodiments of the first aspect, the driver power circuit is configured to: generate an operating voltage required for operation of each of a data driver and a gate driver disposed in the display apparatus, based on the logic voltage, and to supply the operating voltage to each of the data driver and the gate driver; and generate a reference voltage required for operation of the pixels of the display apparatus, based on the logic voltage, and to supply the reference voltage to the pixels.

In accordance with some embodiments of the first aspect, the buck converter is further configured to adjust the high potential voltage of 20V boosted by the boost converter to a logic voltage of 3.3V, and outputs the adjusted logic voltage of 3.3V to the driver power circuit.

In accordance with some embodiments of the first aspect, each of the pixels includes a data supply transistor, a compensation transistor, and a light-emission control transistor.

In accordance with some embodiments of the first aspect, wherein the driver power circuit is configured to, based on the logic voltage of 3.3V adjusted by the boost converter, generate an operating voltage such that the gate driver transmits a light-emission control signal to the light-emission control transistor.

In accordance with some embodiments of the first aspect, wherein the driver power circuit is configured to, based on the logic voltage of 3.3V adjusted by the boost converter, generate an operating voltage such that the gate driver transmits a scan signal to each of the data supply transistor and the compensation transistor.

In accordance with some embodiments of the first aspect, the buck converter is electrically connected to the boost converter via a wiring, and receives the high potential voltage from the boost converter via the wiring while supply of power to the display apparatus is cut off.

A second aspect of the present disclosure provides a display apparatus comprising: a display panel including a plurality of pixels; a timing controller configured to generate a control signal to control an operation of each of a data driver and a gate driver; the data driver configured to generate a data voltage necessary for operation of the pixels based on data drive control signal output from the timing controller and to supply the generated data voltage to the pixels; a gate driver configured to generate a scan signal based on a gate control signal output from the timing controller and to supply the generated scan signal to the pixels; a boost converter configured to receive an input voltage from an external source, to boost the input voltage to a high potential voltage, and to output the high potential voltage; a pixel power circuit configured to, based on the high potential voltage, generate a pixel driving voltage required for operation of the pixels, and to supply the generated pixel driving voltage to the pixels; a buck converter configured to convert the high potential voltage output from the boost converter, and to output the converted logic voltage; and a driver power circuit configured to convert the logic voltage to an operating voltage required for operation of the display apparatus, and to output the operating voltage. Thus, even when the power supplied from the vehicle's battery to the display apparatus is cut off, the screen flashing may be prevented from occurring.

In accordance with some embodiments of the second aspect, the buck converter is configured to supply the logic voltage to the timing controller.

In accordance with some embodiments of the second aspect, the buck converter is further configured to adjust the high potential voltage of 20V boosted by the boost converter to a logic voltage of 3.3V, and outputs the adjusted logic voltage of 3.3V to the driver power circuit.

In accordance with some embodiments of the second aspect, the buck converter is electrically connected to the boost converter via a wiring, and receives the high potential voltage from the boost converter via the wiring while supply of power to the display apparatus is cut off.

In accordance with some embodiments of the second aspect, the external source includes a battery disposed in a vehicle on which the display apparatus is mounted.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A display apparatus, comprising:

a boost converter configured to boost a voltage input thereto to a high potential voltage and to output the high potential voltage;

a pixel power circuit configured to receive the high potential voltage, to generate a pixel driving voltage for operation of pixels disposed in the display apparatus based on the high potential voltage, and to supply the generated pixel driving voltage to the pixels;

a buck converter configured to receive the high potential voltage output from the boost converter to convert the received high potential voltage to a logic voltage, and to output the converted logic voltage; and a driver power circuit configured to receive the output logic voltage, to convert the received logic voltage to an operating voltage for operation of the display apparatus, and to output the operating voltage.

2. The display apparatus of claim 1, wherein the driver power circuit is further configured to:

based on the logic voltage, generate an operating voltage for operation of each of a data driver and a gate driver disposed in the display apparatus, and supply the generated operating voltage to each of the data driver and the gate driver; and based on the logic voltage, generate a reference voltage for operation of the pixels of the display apparatus, and supply the generated reference voltage to the pixels.

3. The display apparatus of claim 2, wherein each of the pixels includes a data supply transistor, a compensation transistor, and a light-emission control transistor.

4. The display apparatus of claim 3, wherein the driver power circuit is further configured to generate, based on the logic voltage of 3.3V adjusted by the boost converter, an operating voltage such that the gate driver transmits a light-emission control signal to the light-emission control transistor.

5. The display apparatus of claim 3, wherein the driver power circuit is further configured to generate, based on the logic voltage of 3.3V adjusted by the boost converter, an operating voltage such that the gate driver transmits a scan signal to each of the data supply transistor and the compensation transistor.

6. The display apparatus of claim 1, wherein the buck converter is further configured to supply the converted logic voltage to a timing controller disposed in the display apparatus.

7. The display apparatus of claim 1, wherein the buck converter is further configured to adjust the high potential voltage of 20V boosted by the boost converter to a logic voltage of 3.3V, and to output the adjusted logic voltage of 3.3V to the driver power circuit.

8. The display apparatus of claim 1, wherein the buck converter is electrically connected to the boost converter via a wiring, and is configured to receive the high potential voltage from the boost converter via the wiring while supply of power to the display apparatus is cut off.

9. A display apparatus, comprising:

a display panel including a plurality of pixels;

a timing controller configured to generate a control signal to control an operation of each of a data driver and a gate driver;

the data driver configured to generate a data voltage for operation of the pixels based on a driver control signal output from the timing controller, and to supply the generated data voltage to the pixels;

the gate driver configured to generate a scan signal based on a gate control signal output from the timing controller, and to supply the generated scan signal to the pixels;

a boost converter configured to receive an input voltage from an external source, to boost the input voltage to a high potential voltage, and to output the high potential voltage;

a pixel power circuit configured to generate, based on the high potential voltage, a pixel driving voltage for operation of the pixels, and to supply the generated pixel driving voltage to the pixels;

a buck converter configured to convert the high potential voltage output from the boost converter to a logic voltage, and to output the converted logic voltage; and a driver power circuit configured to convert the logic voltage to an operating voltage for operation of the display apparatus, and to output the operating voltage.

10. The display apparatus of claim 9, wherein the buck converter is further configured to supply the logic voltage to the timing controller.

11. The display apparatus of claim 9, wherein the buck converter is further configured to adjust the high potential voltage of 20V boosted by the boost converter to a logic voltage of 3.3V, and to output the adjusted logic voltage of 3.3V to the driver power circuit.

12. The display apparatus of claim 9, wherein the buck converter is electrically connected to the boost converter via a wiring, and is configured to receive the high potential voltage from the boost converter via the wiring while supply of power to the display apparatus is cut off.

13. The display apparatus of claim 9, wherein the external source includes a battery disposed in a vehicle on which the display apparatus is mounted.

* * * * *